United States Patent
Inokuchi et al.

(10) Patent No.: US 11,783,048 B2
(45) Date of Patent: Oct. 10, 2023

(54) SECURITY ASSESSMENT SYSTEM

(71) Applicants: NEC CORPORATION, Tokyo (JP); B. G. Negev Technologies and Applications Ltd., at Ben-Gurion University, Beer-Sheva (IL)

(72) Inventors: Masaki Inokuchi, Tokyo (JP); Yoshinobu Ohta, Tokyo (JP); Ron Bitton, Yehud (IL); Orly Stan, Ashdod (IL); Tomer Gluck, Ra'anana (IL); Asaf Shabtai, Hulda (IL); Yuval Elovici, Arugot (IL)

(73) Assignees: NEC CORPORATION, Tokyo (JP); B. G. Negev Technologies and Applications Ltd., at Ben-Gurion University, Beer-Sheva (IL)

( * ) Notice: Subject to any disclaimer, the term of this patent is extended or adjusted under 35 U.S.C. 154(b) by 355 days.

(21) Appl. No.: 16/980,269

(22) PCT Filed: Mar. 14, 2018

(86) PCT No.: PCT/JP2018/010017
§ 371 (c)(1),
(2) Date: Sep. 11, 2020

(87) PCT Pub. No.: WO2019/176022
PCT Pub. Date: Sep. 19, 2019

(65) Prior Publication Data
US 2021/0042423 A1 Feb. 11, 2021

(51) Int. Cl.
*G06F 21/57* (2013.01)
(52) U.S. Cl.
CPC ...... *G06F 21/577* (2013.01); *G06F 2221/034* (2013.01)

(58) Field of Classification Search
CPC ............. G06F 21/566; G06F 21/577; G06F 2221/034; G06F 21/57; H04L 63/1416; H04L 63/1433
See application file for complete search history.

(56) References Cited

U.S. PATENT DOCUMENTS

| | | |
|---|---|---|
| 7,904,962 B1 | 3/2011 | Jajodia et al. |
| 2007/0129926 A1 | 6/2007 | Verheyen et al. |

(Continued)

OTHER PUBLICATIONS

Antoine Lemay et al., "An isolated virtual cluster for SCADA network security research", Proceedings of the 1st International Symposium for ICS & SCADA Cyber Security Research 2013 (ICS-CSR 2013), 2013, Retrieved from: URL: <https://www.scienceopen.com/hosted-document?doi=10.14236/ewic/ICSCSR2013.10> (9 pages total).

(Continued)

*Primary Examiner* — Daniel B Potratz
*Assistant Examiner* — Matthias Habtegeorgis
(74) *Attorney, Agent, or Firm* — Sughrue Mion, PLLC (57) ABSTRACT

A security assessment system is configured to provide a duplicated environment which duplicates an assessment target system comprising a plurality of physical components. The security assessment system includes a duplicated environment design circuitry and a duplicated environment construction circuitry. The duplicated environment design circuitry is configured to select a duplication level based on constraints specified by a user and effects associated with the physical components in order to design the duplicated environment to produce a designed result indicative of a duplicated environment design. The duplication level is indicative of any one of a simulation sub-module, an emulation sub-module, and a physical sub-module which are for reproducing the physical components of the assessment target system. The duplicated environment construction cir- (Continued)

cuitry is configured to construct the duplicated environment based on the designed result. The duplicated environment includes components which are duplicated by one of the duplication level.

9 Claims, 4 Drawing Sheets

(56) References Cited

U.S. PATENT DOCUMENTS

| | | |
|---|---|---|
| 2014/0137257 A1 | 5/2014 | Martinez et al. |
| 2014/0337000 A1* | 11/2014 | Asenjo .................. G06Q 10/06 703/13 |
| 2016/0182309 A1* | 6/2016 | Maturana .............. H04L 41/145 709/224 |
| 2016/0231716 A1* | 8/2016 | Johnson ............... G05B 13/041 |

OTHER PUBLICATIONS

Benjamin Green et al., "Pains, Gains and PLCs: Ten Lessons from Building an Industrial Control Systems Testbed for Security Research", Proceedings of 10th USENIX Workshop on Cyber Security Experimentation and Test (CSET 17), 2017, Retrieved from: URL: <https://www.usenix.org/conference/cset17/workshop-program/presentation/green> (8 pages total).

International Search Report of PCT/JP2018/010017 dated Jun. 19, 2018 [PCT/ISA/210].

Written Opinion of PCT/JP2018/010017 dated Jun. 19, 2018 [PCT/ISA/237].

* cited by examiner

SECURITY ASSESSMENT SYSTEM

CROSS REFERENCE TO RELATED APPLICATIONS

This application is a National Stage of International Application No. PCT/JP2018/010017, filed Mar. 14, 2018.

TECHNICAL FIELD

The present invention relates to a security assessment system, and in particular to a security assessment system which need to detect attack paths such as demand for OT (Operation Technology) system security.

BACKGROUND ART

The OT is the hardware and software dedicated to detecting or causing changes in physical process through direct monitoring and/or control of physical devices such as valves, pumps, etc. The OT is the use of computers to monitor or alter the physical state of a system, such as the control system for a power station or the control network for a rail system.

In related arts for the security assessment, there are an assessment based on active scan, a pen-test on the actual system, and an assessment on the system which is completely duplicated by using real hardware.

In the manner known in the art, digital twin refers to a digital replica of physical assets, processes and systems that can be used for various purposes. The digital representation provides both the elements and the dynamics of how an Internet of Things device operates and lives through its life cycle.

The digital twin integrates artificial intelligence, machine learning and software analytics with data to create living digital simulation models that update and change as their physical counterparts change. The digital twin continuously leans and updates itself from multiple sources to represent its near real-time status, working condition or position.

SUMMARY OF INVENTION

Technical Problem

There are problems in the above-mentioned related arts.

The assessment based on active scan is not suitable for the OT system. This is because it is potential to impact on the system.

The pen-test on the actual system is also not suitable for the OT system. This is because it is also potential to impact on the system.

The assessment on the system which is completely duplicated by using real hardware is too expensive. This is because the real hardware used in the actual system is duplicated.

Summing up, the above-mentioned related technique cannot achieve the accurate assessment which is low cost and don't impact the OT system. The active scan on actual OT systems is prohibited. On the other hand, passive scan result is not enough to determine attack path accurately. In addition, some components cannot be modeled.

Solution of Problem

As a mode of the present invention, a security assessment system is configured to provide a duplicated environment which duplicates an assessment target system comprising a plurality of physical components. The security assessment system comprises a duplicated environment design circuitry configured to select a duplication level for each physical component based on constraints specified by a user and effects associated with the physical components in order to design the duplicated environment to produce a designed result indicative of duplicated environment design, the duplication level being indicative of any one of a simulation sub-module, an emulation sub-module, and a physical sub-module for reproducing the physical components of the security target system; and a duplicated environment construction circuitry configured to construct the duplicated environment based on the design, the duplicated environment comprises components which are duplicated by one of the duplication level.

Advantageous Effects of Invention

An exemplary effect of the present invention can determine a duplication level for each physical component in an assessment target system effectively.

DESCRIPTION OF EMBODIMENTS

Now, an example embodiment of the present invention will be described.

Figure 1:
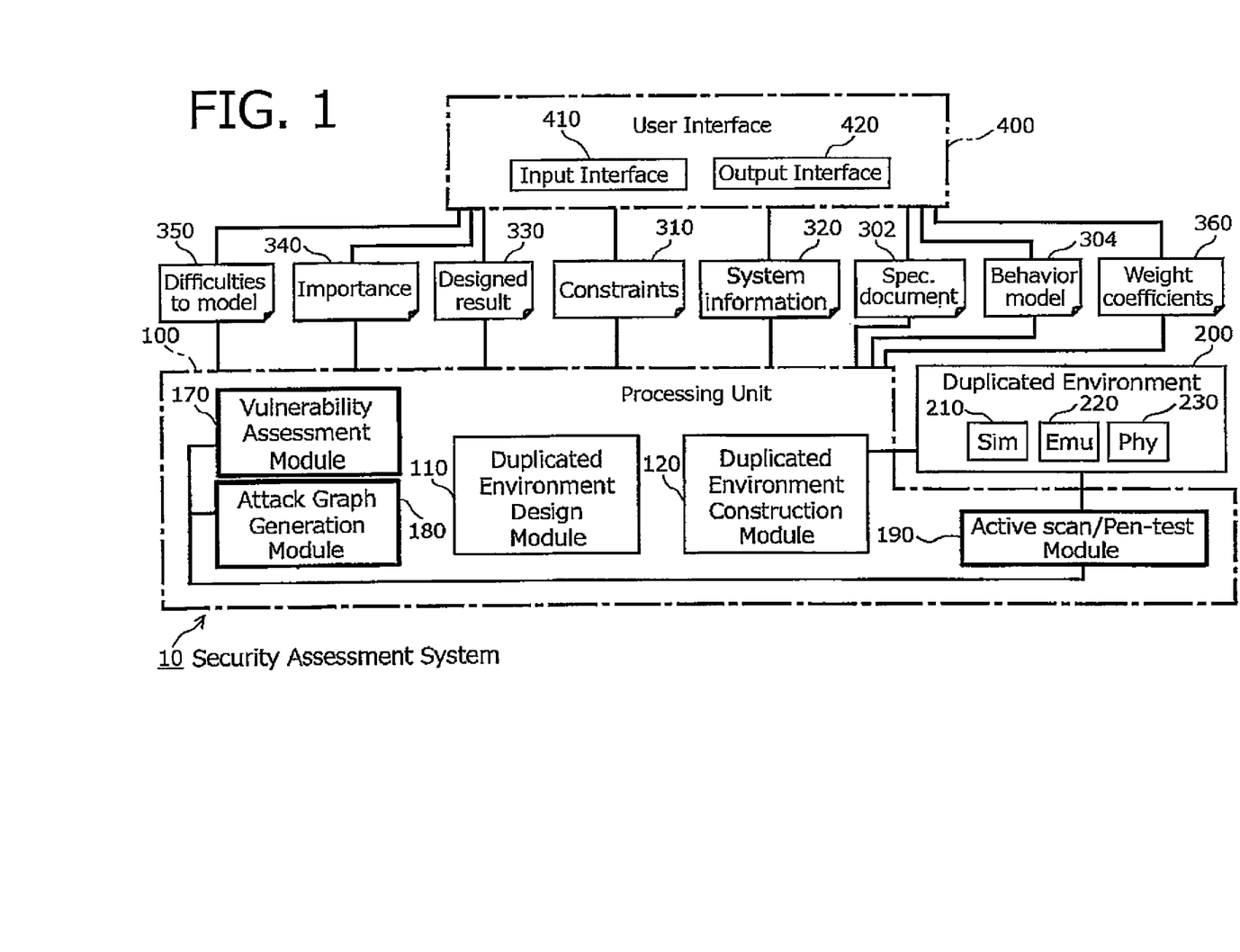
FIG. 1 is a block diagram that illustrates a structure example of a security assessment system according to an example embodiment in the present invention.

FIG. 1 is a block diagram that illustrates a structure example of a security assessment system 10 according to the example embodiment in the present invention. The security assessment system 10 is configured to provide a duplicated environment 200 which duplicates an assessment target system (not shown) comprising a plurality of physical components. The duplicated environment 200 serves as the above-mentioned digital twin. It is noted that the digital twin, on the one hand, allows running required security/pen tests, and on the other hand, all the results that are obtained from executing the tests on the digital twin reflect the expected results of the tests if they would have executed on the real environment. The security assessment system 10 comprises a processing unit 100 and a user interface 400. The processing unit 100 comprises a duplicated environment design module 110, a duplicated environment construction module 120, a vulnerability assessment module 170, an attack graph generation module 180, and an active scan/pen-test module 190. The user interface 400 comprises an input interface 410 and an output interface 420.

In the example being illustrated, the duplicated environment 200 has a simulation sub-module 210, an emulation sub-module 220, and a physical sub-module 230. The simulation sub-module 210 is a specification 302 of the physical component or a behavior model 304 of a function of the physical component. The emulation sub-module 220 comprises software which reproduces the physical component using a VM (virtual machine). The physical sub-module 230 comprises a component which is physically similar to the physical component in the assessment target system.

More specifically, in the simulation sub-module 210, the specification 302 of the physical component comprises a list of hardware/software and version which the physical component has. The specification 302 of the physical component typically may, for example, be a specification which is provided by a vender or a specification in which information is integrated in accordance with CPE (Common Product Enumeration). The specification 302 of the physical component may have vulnerability information which is found by a vulnerability scanner. The simulation sub-module 210 may hierarchically have a derailed specification of each of software and hardware.

In the simulation sub-module 210, the behavior model 304 relates to a communication protocol or the like in which behavior is determined and comprises a module describing the behavior or a document associated to the behavior. Specifically, the behavior model 304 may be documents defining the behavior of the physical component such as RFC (Request for Comments) or may be a document obtained by summarizing responses for inputs which are described based on the above-mentioned documents. The behavior model 304 may be a mathematical model of the behavior. For instance, the communication protocol may be described by a state transition diagram or a Petri net. The behavior model 304 may be software for reproducing only responses addressing to inputs. However, software for reproducing a behavior of internal states in the physical component is handled by the emulation sub-module 220 in the manner which will presently be described.

In the emulation sub-module 220, the physical component is reproduced by the VM. That is, the emulation sub-module 220 comprises software which reproduces a behavior of the internal states in the physical component. Concerning software, the emulation sub-module 220 uses software which is identical with that of the assessment target system.

As described above, the physical sub-module 230 comprises a component which is physically similar to the physical component in the assessment target system. That is, in the physical sub-module 230, the same hardware in the assessment target system is used and the same software in the assessment target system initially operates with the same configuration thereof.

As shown in FIG. 1, the duplicated environment design module 110 is supplied with constraints 310 specified by a user, and with system information 320, importance 340 of each physical component, difficulties 350 to model each physical component, potential to refine a security diagnosis (which will become clear as the description proceeds), and weight coefficients 360. The input interface 410 supplies the duplicated environment design module 110 with the constraints 310, the system information 320, the importance 340, the difficulties to model 350, and the weight coefficients 360. The constraints 310 may be requirements. In the example being illustrated, the constraints 310 comprises budget or waiting time (acceptable time). Other constraint may be physical space for deploying the digital twin, or multiple use of the same element in the digital twin. The constraints 310 further comprises required cost and required time for each duplication level to prepare the emulation sub-module 220 or the physical sub-module 230. The duplicated environment design module 110 calculates, for each physical component, a sum of the required cost or a maximum value of the required time. The duplicated environment design module 110 determines the duplication level for each physical component so that the sum of the required cost is not more than the budget or the maximum value of the required time is not more than the acceptable time.

The importance 340 of each physical component, the difficulties 350 to model each physical component, the potential to refine a security diagnosis, and the weight coefficients 360 will later be described in detail.

The duplicated environment design module 110 is also supplied with effects associated with the physical components that will become clear as the description proceeds. In the example being illustrated, the effects comprise a duplicated priority of each physical component that is determined based on the importance 340 of each physical component, the potential to refine a security diagnosis, and the difficulties 350 to model each physical component in the manner which will later be described. Although the duplicated priority of each physical component is determined based on all of the importance 340 of each physical component, the potential to refine a security diagnosis, and the difficulties 350 to model each physical component in the example embodiment, the duplicated priority of each physical component may be determined based on at least one selected from the group consisting of the importance 340 of each physical component, the potential to refine a security diagnosis, and the difficulties 360 to model each physical component in this invention.

Now, the description will proceed to effective components in the plurality of physical components of the assessment target system. The effective components are classified into first through third groups in the example embodiment in the manner which will presently be described.

The first group of the effective components comprises one or more components which are highly required to access accurately. Such components bear, for example, important asset or important role to maintain the assessment target system.

The second group of the effective components comprises one or more components which can be effectively refine the results of security assessment by accurate assessment. Such components comprise, for example, nodes which are detected may potential vulnerability and/or nodes which used many attack on attack graph.

The third group of the effective components comprises one or more components which are difficult to access without the emulation sub-module 220 or the physical sub-module 230. Such components comprise, for example, nodes which are difficult to model its behavior (security software) or nodes which tend to have vulnerabilities which are difficult to detect by passive scan (like web application).

The duplicated environment design module 110 decides, in accordance with the constraints 310, the system information 320, and the above-mentioned effects, which physical component in the assessment target system should be assessed by the simulation sub-module 210, the emulation sub-module 220, or the physical sub-module 230 to produce a designed result 330 indicative of a duplicated environment design. With the defined constraints, a target function that is desired to be maximized may be defined. This function represents the benefit from the selected digital twin. The benefit can be the value of the security tests that can be executed on the digital twin. In other words, the duplicated environment design module 110 is configured to select a duplication level for each physical component based on the constrains 310 and the above-mentioned effects associated with the physical components in order to design the duplicated environment 200 to produce the designed result 330 indicative of the duplicated environment design. The output interface 420 is configured to output the designed result 330. The duplication level is indicative of any one of the simulation sub-module 210, the emulation sub-module 220, and the physical sub-module 230 which are for reproducing the physical components of the duplicated environment 200.

More specifically, in the manner which is described above, the constraints 310 comprise at least one of the budget and the acceptable time. The duplicated environment design module 110 is configured to select the duplication level for each physical component so as to satisfy condition that required cost doesn't exceed the budget or required time doesn't exceed the acceptable time based on, as the above-mentioned effects, the above-mentioned duplicated priority of each physical component in the manner which will later be described.

In the example embodiment, a cost of the duplicated environment 200 may comprise not only a cost required for emulating or physicalizing each apparatus in the assessment target system but also a security diagnosis cost required in a case where a security diagnosis is carried out on emulating or physicalizing the apparatus in question. The security diagnosis cost contains personnel expenses of a diagnosis person. This is because there is no sense in physicalizing the apparatus in question in a case of excessing the budget because a huge cost takes for diagnosis itself although it is possible to carry out an effective diagnosis of the apparatus in question by using a real apparatus and the apparatus in question has a low cost. In this event, the input interface 410 inputs the security diagnosis cost that complies with a classification of a security diagnosis action which will later be described.

The duplicated environment construction module 120 constructs the duplicated environment 200 based on the designed result 330. The duplicated environment 200 provides the duplicated environment 200 for other software or a user (security expert, pen-tester).

The vulnerability assessment module 170 extracts vulnerabilities of each component in the duplicated environment 200 to generate a list of the extracted vulnerabilities. The attack graph generation module 180 generates an attack graph in which components in the duplicated environment 200 used in an attack can be distinguished. The duplicated environment design module 110 designs the duplicated environment 200 based on at least one of the list and the attack graph. In other words, the duplicated environment design module 110 is configured to select the duplication level based on at least one of the list and the attack graph. The active scan/pen-test module 190 actively scans or pen-tests on the virtual machines of the emulation sub-module 220 or the physical machines of the physical sub-module 230 in the duplicated environment 200. The processing unit 100 in the security assessment system 10 iteratively performs the above-mentioned process and refines the result of security assessment.

Now, the description will proceed to operations of the vulnerability assessment module 170, the attack graph generation module 180, and the active scan/pen-test module 190 in detail.

The vulnerability assessment module 170 examines whether or not there are which vulnerability about each component in the duplicated environment 200. Typically, such an examination can be realized by comparing information in an existing vulnerability information database (not shown) and system information obtained by passive scanning. In a case where the information is incorrect, the vulnerability assessment module 170 may overlook the vulnerability which originally exists in or may detect a large number of the vulnerability which does not exist.

The attack graph generation module 180 generates the attack graph where an attack procedure of an attacker is graphed. Typically, the attack graph comprises, as nodes, system state nodes indicative of system states and attacker state nodes indicative of attacker states. The attack graph comprises oriented sides from the system state nodes, which become necessary conditions in order to take the attacker actions, to the corresponding attacker state nodes. In addition, the attack graph comprises oriented sides from the attacker action states to states produced by the attacker actions. The attack graph presents information indicating how many kinds of attacks is used in a host or information indicating which vulnerability is used as an attack.

The active scan/pen-test module 190 comprises an interface for other software and other users which can perform the active scan and penetration test to the components reproduced in the emulation sub-module 220 and the physical sub-module 230 on the duplicated environment 200. In addition, the active scan/pen-test module 190 may comprise an interface which is configured to input results of the active scan and the penetration test and which is configured to inform the vulnerability assessment module 170 and the attack graph generation module 180 of the results. The active scan/pen-test module 190 may have an active scan function and a penetration test function to automatically perform the active scan and the penetration test. For example, the active scan/pen-test module 190 may comprise an existing active scan tool and/or an existing penetration test tool to perform a predetermined active scan and/or a predetermined penetration test. The existing active scan tool may, for example, be "Open VAS" while the existing penetration test tool may, for example, be "metasploit". The active scan/pen-test module 190 may collect vulnerability attack codes published to carry out the penetration test using the vulnerability attack codes corresponding to the assessment target components.

A combination of the active scan/pen-test module 190, the vulnerability assessment module 170, and the attack graph generation module 180 serves as a diagnosis interface configured to carry out, on the duplicated environment 200, a security diagnosis including at least one of an active scan and a penetration test.

Figure 2:
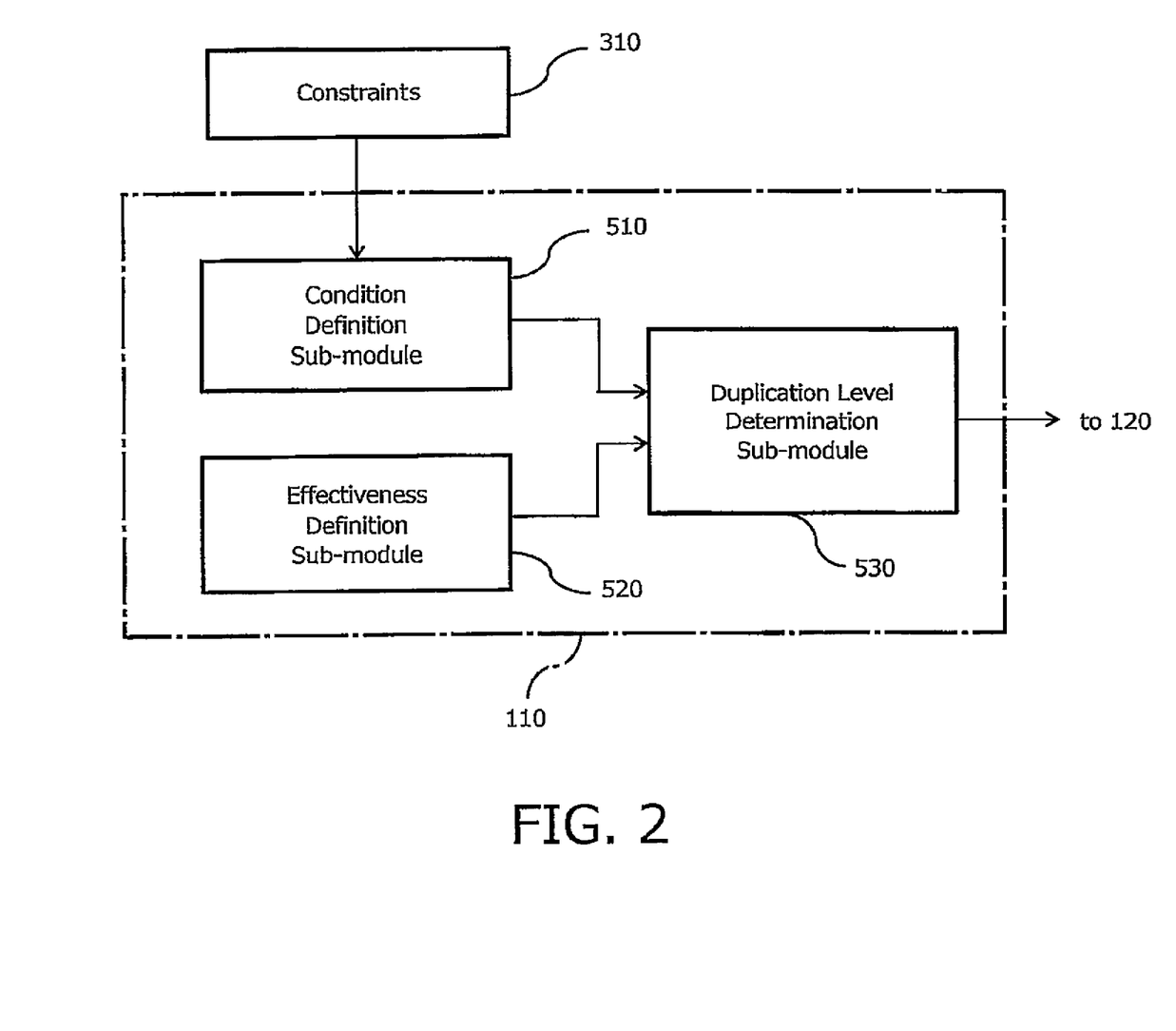
FIG. 2 is a block diagram that illustrates a structure example of a duplicated environment design module used in the security assessment system illustrated in FIG. 1.

Referring to FIG. 2, the description will proceed to a configuration of the duplicated environment design module 110 in detail. The duplicated environment design module 110 comprises a condition definition sub-module 510, an effectiveness definition sub-module 520, and a duplication level determination sub-module 530.

The condition definition sub-module 510 is configured to define conditions based on the constraints 310 to produce a first defined result indicative of the conditions. In the example being illustrated, the first defined result indicates whether or not it is satisfied condition that required cost doesn't exceed the budget or the required time doesn't exceed the acceptable time.

The effectiveness definition sub-module 520 is configured to define effectiveness for the physical components in the assessment target system based on the above-mentioned effects to produce a second defined result indicative of the effectiveness. In the example being illustrated, the second defines result indicates the above-mentioned duplicated priority of each physical component.

The duplication level determination sub-module 530 is configured to determine the duplication level based on the first and the second defined results. The duplication level is supplied to the duplicated environment construction module 120.

Figure 3:
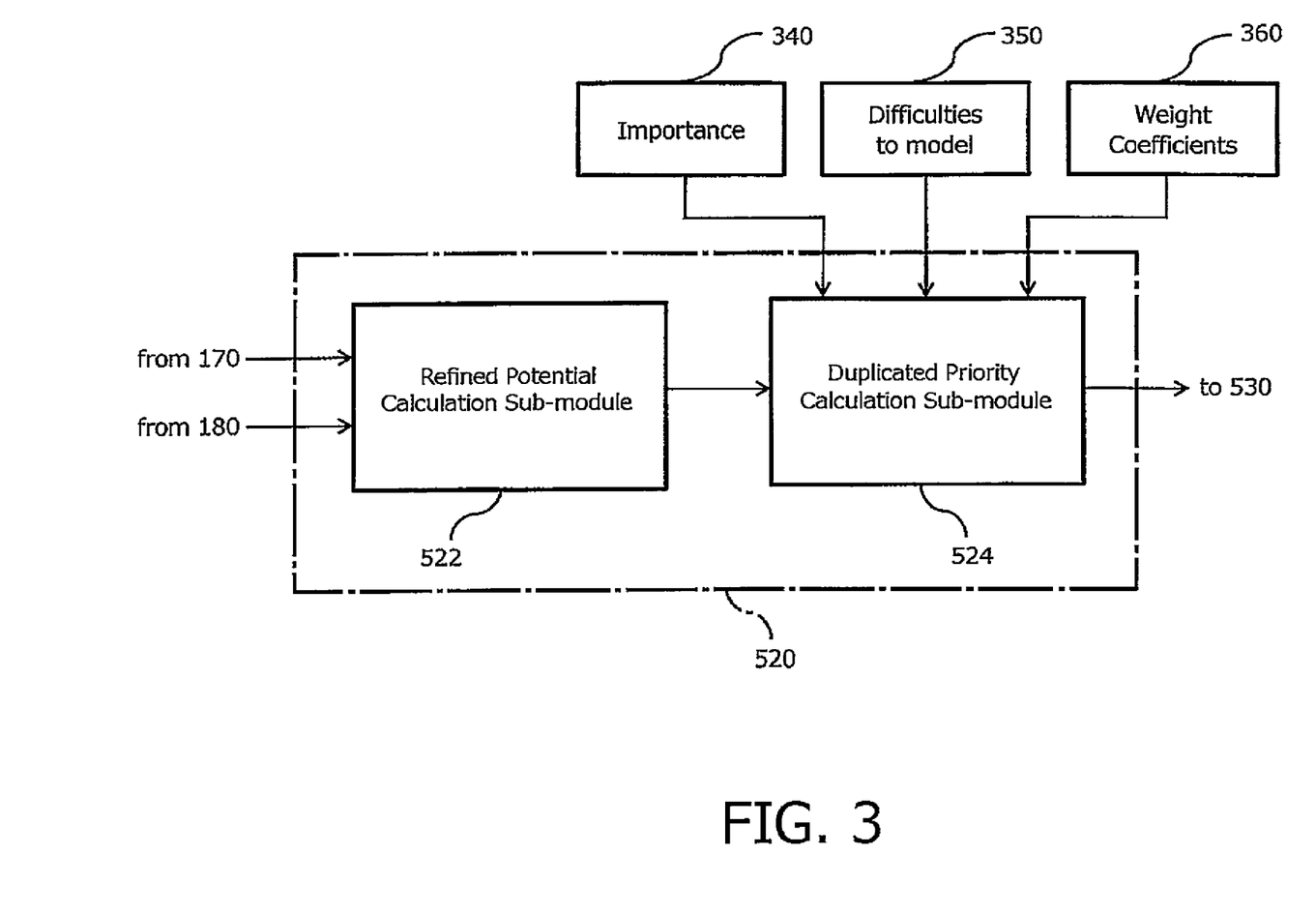
FIG. 3 is a block diagram that illustrates a structure example of an effectiveness definition sub-module used in the duplicated environment design module illustrated in FIG. 2.

Referring to FIG. 3, the description will proceed to a configuration of the effectiveness definition sub-module 520 in detail. The effectiveness definition sub-module 520 comprises a refined potential calculation sub-module 522 and a duplicated priority calculation sub-module 524.

The refined potential calculation sub-module 522 is connected to the vulnerability assessment module 170, the attack graph generation module 180, and a passive scanner (not shown) for carrying out a passive scan. The refined potential calculation sub-module 522 is supplied with the above-mentioned list of the extracted vulnerabilities from the vulnerability assessment module 170. The refined potential calculation sub-module 522 is supplied with the above-mentioned attack graph from the attack graph generation module 180. The refined potential calculation sub-module 522 is supplied with information obtained by the passive scanner. In the manner which presently be described, the refined potential calculation sub-module 522 calculates the above-mentioned refined potential based on at least one selected from the group consisting of the list of the extracted vulnerabilities, the attack graph, and the information obtained by the passive scan to produce a refined potential Pr indicative of the potential to refine a security diagnosis.

First, the description will proceed to a first example in a case of calculating the potential to refine a security diagnosis based on the list of the extracted vulnerabilities. The refined potential calculation sub-module 522 calculates the refined potential Pr based on the number Nv of the vulnerabilities obtained by the vulnerability assessment module 170 or a score determined for the respective vulnerabilities.

More specifically, the number Nv of the vulnerabilities in which each physical component has becomes in the vulnerability assessment sub-module 170. It will be assumed that the assessment target system comprises, as the physical components, four host processors, namely, a host A, a host B, a host C, and a host D which have the number Nv of the vulnerabilities of twenty (20), fifty-five (55), a five (5), and thirty (30), respectively. The refined potential calculation sub-module 522 preliminarily defines the lowest limit Ll and the upper limit Lu for the number Nv of the vulnerabilities. It will be assumed that the lowest limit Ll and the upper limit Lu are equal to ten (10) and fifty (50), respectively.

The refined potential calculation sub-module 522 scales the number Nv of the vulnerabilities into a predetermined range, for example, between 0 and 10. The refined potential calculation sub-module 522 makes the refined potential Pr zero (0) when the number Nv of the vulnerabilities is not more than the lowest limit Ll and makes the refined potential Pr ten (10) when number Nv of the vulnerabilities is not less than the upper limit Lu. When the number Nv of the vulnerabilities is more than the lowest limit Ll and is less than the upper limit Lu, the refined potential calculation sub-module 522 calculates the refined potential Pr according to the following Equation:

$$Pr = 10 \times \{(Nv-Ll)/(Lu-Ll)\}$$

In the example being illustrated, the refined potential calculation sub-module 522 calculates, as the refined potential Pr for the hosts A, B, C, and D, 2.5, 10, 0, and 5, respectively.

The description will proceed to advantageous effects in the first example. The vulnerability assessment module 170 may erroneously detect any vulnerability which does not exist originally. Under the circumstances, it is possible to remove the erroneously detected vulnerability by minutely assessing the physical components having a large number of vulnerabilities by using the physical sub-module 230 or the emulation sub-module 220 and it is therefore possible to carry out the security diagnosis more accurately.

The refined potential calculation sub-module 522 may use the total value of the score (e.g. CVSS (Common Vulnerability Scoring System) or the like) determined for the respective vulnerabilities in lieu of the number Nv of the vulnerabilities.

Second, the description will proceed to a second example in a case of calculating the potential to refine a security diagnosis based on the attack graph.

As described above, typically, the attack graph comprises, as nodes, system state nodes indicative of system states and attacker state nodes indicative of attacker states. The attack graph comprises oriented sides from the system state nodes, which become necessary conditions in order to take the attacker actions, to the corresponding attacker state nodes. In addition, the attack graph comprises oriented sides from the attacker action states to states produced by the attacker actions.

A user supplies, using the input interface 410, the duplicated environment design module 110 with a starting point of an attack (an initial state of an attacker) and a target of the attacker (a final state of the attacker). The user may set a plurality of stating points and a plurality of targets.

Figure 4:
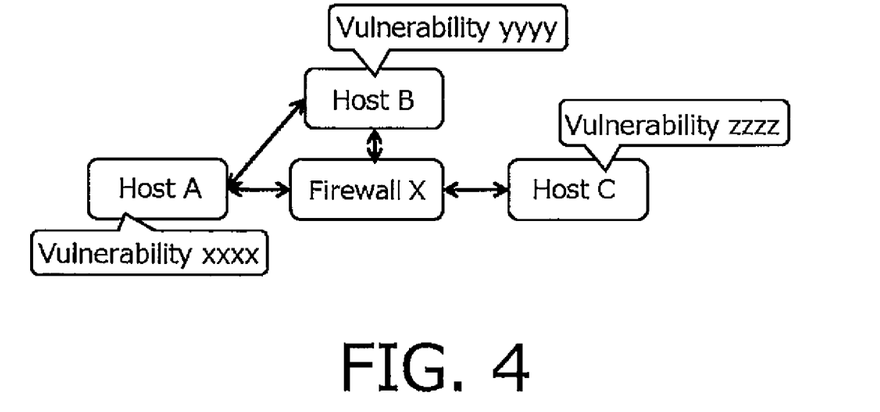
FIG. 4 is a block diagram that illustrates a structure example of a system configuration assumed in an example of an attack graph.

FIG. 4 is a block diagram that illustrates a structure example of a system configuration assumed in an example of an attack graph. As shown in FIG. 4, it will be assumed that the assessment target system comprises, as the physical components, a host A, a host B, a host C, and a firewall X. The firewall X is disposed between the host A, the host B, and the host C. That is, the firewall X is connected to the host A, the host B, and the host C. The host A is connected to the host B. It will also be assumed that the hosts A, B, and C have the vulnerability of xxxx, yyyy, and zzzz, respectively.

Under the circumstances, the attack graph has the initial state Sin, the final state Sfn, and first through third intermediate states Sm1, Sm2, and Sm3 between the initial state Sin and the final state Sfn. The initial state Sin is, for example, a state where a malicious code is executed in the host A. The initial state Sin is followed by the first intermediate state Sm1 which is, for example, a state where it is possible to execute any code with an administrative privilege on the host A by attacking the vulnerability (ID xxxx) of privilege escalation in the host A. The first intermediate state Sm1 is followed by the second intermediate state Sm2 which is, for example, a state where it is possible to execute any code with an administrative privilege on the host B by attacking the vulnerability of yyyy in a service on the host B which can be accessed from the host A. The second intermediate state Sm2 is followed by the third intermediate state Sm3 which is, for example, a state where a filtering rule of the firewall X managed by the host B is rewritten so as to be enable to communicate between the host A and the host C. The third intermediate state Sm3 is followed by the final state Sfn which is, for example, a state where it is possible to execute any code with an administrative privilege on the host C by attacking the vulnerability of zzzz in a service on the host C which can be accessed from the host A. The final state Sfn also follows the first intermediate state Sm1.

The above-mentioned attack graph makes clear the host used to the attack, the vulnerabilities, and a procedure of the attack. As apparent from the description regarding to the attack graph, in general, there are a plurality of paths which arrives from the initial state Sin to the final state Sfn.

The refined potential calculation sub-module 522 calculates the refined potential Pr for the hosts A, B, and C so that the physical component used by more paths has a high refined potential. Specifically, the refined potential calculation sub-module 522 first calculates, for each physical component, a count which appears in the paths between the initial state Sin from the final state Sfn, scales a calculated count into a predetermined range (e.g. from 0 to 10) based on a predefined lowest limit value and an predefined upper limit value, and calculates the refined potential Pr for the hosts A, B, and C.

The description will proceed to advantageous effects in the second example. It is possible to correctly determine whether or not the physical component is actually used to attack by minutely assessing the physical component by using physical sub-module 230 or the emulation sub-module 220 and it is therefore possible to remove any path which cannot attack originally.

Although the refined potential calculation sub-module 522 calculates the refined potential Pr for the hosts A, B, and C based on the count of the host that appears in all of the attack paths in the above-mentioned second example, the refined potential calculation sub-module 522 may be modified to calculate the refined potential Pr for a particular host based on a count of the attack paths that uses the particular host. The refined potential calculation sub-module 522 counts the number of each host individually in a case where the same host appears in a special attack path a number of times in the above-mentioned example. In contrast to this, in the modified example, the refined potential calculation sub-module 522 counts the number of the particular host once although the particular host appears in the same attack path many times. With this configuration, it is possible to prevent the refined potential calculation sub-module 522 from calculating an excessive value for the particular host in a situation where the special attack path uses the particular host many times.

Finally, the description will proceed to a third example in a case of calculating the potential to refine a security diagnosis based on the information obtained by the passive scan. In the manner known in the art, the passive scan collects information by observing any signal which flows through a communication channel. Differing from the active scan, in the passive scan, a signal for correcting the information is not sent. Therefore, the passive scan does not have an influence on the assessment target system. The refined potential calculation sub-module 522 determines that the smaller the information by the passive scan, the higher the potential to refine a security diagnosis for each physical component in the assessment target system.

More specifically, the refined potential calculation sub-module 522 preliminarily prepares a list of items which require information for assessment. The items may, for example, comprise free ports, hardware specification (e.g. common product enumeration of a memory, a CPU (central processing unit) and hard disk or the like).

The refined potential calculation sub-module 522 sets the potential to refine a security diagnosis to make high when a rate Rps of the information obtained by the passive scan is small in the items which require information for assessment. More specifically, the refined potential calculation sub-module 522 first subtracts the rate Rps of the information obtained by the passive scan from 1 to produce a subtracted result (1−Rps), scales the subtracted result (1−Rps) into a predetermined range (e.g. from 0 to 10) based on a pre-defined lowest limit value and an predefined upper limit value, and calculates the refined potential Pr for the respective physical components in the assessment target system.

The description will proceed to advantageous effects in the third example. It is possible to obtain much information for the physical component which cannot obtain information because the physical component in question is preferentially duplicated as the physical sub-module 230 or the emulation sub-module 220 in the duplicated environment 200.

The refined potential calculation sub-module 522 may calculate the above-mentioned refined potential based on the above-mentioned classification of the security diagnosis actions which may be carried out on the duplicated environment 200 or a sum of effects thereof.

In this event, the security assessment system 10 further comprises a database for storing, each classification of the apparatus, information indicating which security diagnosis action can be carried out in a case where a real apparatus is used as the apparatus in question or in a case where a virtual machine is used as the apparatus in question. Alternatively, the input interface 410 may input information indicative of the security diagnosis actions which can be carried out by a user.

In a similar manner, the security assessment system 10 further comprises another database for storing, each of the security diagnosis actions, information indicative of degrees of the effects which are preliminarily set. Such information includes a numerical value in a specific range. Alternatively, the input interface 410 may input the information in question by the user.

Turning back to FIG. 3, the description will proceed to operation of the duplicated priority calculation sub-module 524. The duplicated priority calculation sub-module 524 is connected to the refined potential calculation sub-module 522 and the user interface 400 (FIG. 1). The duplicated priority calculation sub-module 524 is supplied with the potential to refine a security diagnosis (the refined potential) from the refined potential calculation sub-module 522. The duplicated priority calculation sub-module 524 is supplied with importance 340 of each physical component, the difficulties 350 to model, and the weight coefficients 360 from the input interface 410 of the user interface 400. The duplicated priority calculation sub-module 524 calculates the duplicated priority of each physical component based on the importance 340 of each physical component, the refined potential, the difficulties 360 to model each physical component, and the weight coefficients 360 in the manner which will later be described. Although the duplicated priority calculation sub-module 524 uses all of the importance 340 of each physical component, the refined potential, the difficulties 360 to model each physical component in the present example embodiment, the duplicated priority calculation sub-module 524 may use at least one selected from the group consisting of the importance 340 of each physical component, the refined potential, the difficulties 360 to model each physical component in this invention.

The description will proceed to the importance 340 of each physical component supplied from the input interface 410. The importance 340 of each physical component may be values inputted via the input interface 410 by user. Instead of this, the importance 340 of each physical component may be one obtained by scaling the inputted values into an appropriate range.

The importance 340 of each physical component may be preliminarily determined for each type of the physical component. Specifically, a system administrator preliminarily sets, as the importance 340 of each physical component, any of the following values. In the example being illustrated, the type of physical component comprises at least one selected from the group consisting of PLC (Programmable Logic Controller), EWS (Engineering Work Station), Historian, HMI (Human Machin Interface), and an IT (information technology) apparatus of IT area.

The system administrator sets the value of "9" as the importance 340 of the PLC. This is because the PLC directly has effect on behavior of control apparatuses. The system administrator sets the value of "8" as the importance 340 of the EWS. This is because logic for determining behavior of the PLC from the EWS is written in the PLC. However, the EWS has the importance 340 which is lower than that of the PLC, because a processing to write the logic of the PLC is required to have effect on the control apparatuses. The system administrator sets the value of "5" as the importance 340 of the Historian. This is because the Historian has a main object for taking a log and the Historian has a relatively small effect on attack. The system administrator sets the value of "7" as the importance 340 of the HMI that is lower than that of the PLC or the EWS. This is because the HMI comprises a component serving as an interface between the user and the control apparatus and has a large effectiveness but the HMI becomes easily aware of attack and can indirectly have effect on control alone. The IT apparatus comprises an apparatus except for any industrial control apparatus and an apparatus which is directly connected to the industrial control apparatus. The system administrator sets the value of "4" as the importance 340 of the IT apparatus. This is because the IT apparatus alone have a small effect on a control system.

In general, OT apparatus (the industrial control apparatus) such as the PLC, the HMI, or the like is partitioned in a zone which is different from a network of an office system (the IT area). The OT apparatus has the effectiveness which is higher than that of the IT apparatus.

The description will proceed to the difficulties 350 to model each physical component supplied from the input interface 410. The difficulties 350 to model each physical component may be values inputted via the input interface 410 by user. Instead of this, the difficulties 350 to model each physical component may be one obtained by scaling the inputted values into an appropriate range.

The difficulties 350 to model each physical component may be preliminarily determined for each type of the physical component. Specifically, a system administrator preliminarily sets, as the difficulties 350 to model each physical component, any of the following values. In the example being illustrated, the type of physical component comprises at least one selected from the group consisting of security measure software, a Web application, and general software.

The system administrator sets the value of "10" as the difficulties 350 to model the security measure software. This is because an effect in which behavior of the security measure software causes an attack action to have is difficulties to model and it is therefore desirable to operate real security measure software in the emulation sub-module 220. The system administrator sets the value of "10" as the difficulties 350 to model the Web application. This is because the Web application has a lot of vulnerabilities which are difficult to detect by using only information obtained by the passive scan such as SQL (Structured Query Language) Injection or the like. The system administrator sets the value of "5" as the difficulties 350 to model the general software. This is because the general software can assess using vulnerability information and has a low necessary to reproduce behavior.

In the manner which is described above, in the example being illustrated, the duplicated priority calculation sub-module 524 calculates the duplicated priority of each physical component based on the importance 340 of each physical component, the refined potential, the difficulties 350 to model each physical component, and the weight coefficients 360. In other words, the duplicated priority of each physical component is determined based on three elements, namely, the importance 340 of each physical component, the refined potential, and the difficulties 360 to model each physical component.

More specifically, the duplicated priority calculation sub-module 524 calculates the duplicated priority Pd of each physical component in the manner which will presently be described. In the manner as described above, the value for each element is individually determined so that each element has a higher value in the predetermined range (between 0 and 10) when the duplicated priority of each physical component has a higher value. The duplicated priority calculation sub-module 524 is supplied with first through third weight coefficients a1, a2, and a3 as the weight coefficients 360 from the input interface 410. It will be assumed that the importance 340 of each physical component, the refined potential, and the difficulties 360 to model each physical component are represented by Ip, Pr, and Dm, respectively. In this event, the duplicated priority calculation sub-module 524 calculates the duplicated priority Pd of each physical component in accordance with the following Equation:

$$Pd=(a1 \times Ip)+(a2 \times Pr)+(a3 \times Dm)$$

The description will proceed to an example of a method of using the duplicated priority Pd of each physical component. First, the duplicated environment design module 110 designs, within the budgets, a first group of the physical components in descending order of the duplicated priority Pd as the physical sub-module 230. If a special one in the physical components in question comprises software or does not used as hardware, the duplicated environment design module 110 designs the special physical component as the emulation sub-module 220. Subsequently, the duplicated environment designs module 110 designs, within the remaining budgets, a second group of the remaining physical components in descending order of the duplicated priority Pd as the emulation sub-module 220. Finally, the duplicated environment designs module 110 designs all of the remaining physical components as the simulation sub-module 210.

According to the above-mentioned example embodiment, it is possible to determine the duplication level for each physical component in the assessment target system effectively.

The respective modules of the processing unit 100 in the security assessment system 10 may be realized using a combination of hardware and software. In a mode of the combination of the hardware and the software, the respective modules are realized as various means by developing a security assessment program in a RAM (random access memory) and by operating hardware such as a control unit (CPU (central processing unit)) or the like based on the security assessment program. The security assessment program may be recorded in a recording medium which may be distributed. The security assessment program recorded in the recording medium is read in a memory via a wire, wireless, or the recording medium itself to operate the control unit or the like. The recording medium may by example be an optical disc, a magnetic disk, a semiconductor memory device, a hard disc, or the like.

If describing the above-mentioned example embodiment by another expression, the processing unit 100 in the security assessment system 10 can be realized to cause a computer to operate, based on the security assessment program developed in the RAM, the duplicated environment design module 110, the duplicated environment construction module 120, the vulnerability assessment module 170, the attack graph generation module 180, and the active scan/pen-test module 190.

While the invention has been particularly shown and described with reference to an example embodiment thereof, the invention is not limited to the embodiment. It will be understood by those of ordinary skill in the art that various changes in form and details may be made therein without departing from the spirit and scope of the present invention as defined by the claim.

For example, although each of the simulation sub-module 210, the emulation sub-module 220, and the physical sub-module 230 in the duplicated environment 200 is typically determined in each host (physical device), this invention does not be limited to this. About a host, the simulation sub-module 210, the emulation sub-module 220, and the physical sub-module 230 are determined each of components in the host. For example, only specific software may be emulated. In place of this, only NIC (Network Interface Card) may be configured as the physical sub-module 230 and others may be realized by operating the virtual machines (VMs) on another hardware (HW).

REFERENCE SIGNS LIST

10 Security Assessment System
100 Processing Unit
110 Duplicated Environment Design Module
120 Duplicated Environment Construction Module
170 Vulnerability Assessment Module
180 Attack Graph Generation Module
190 Active scan/Pen-test Module
200 Duplicated Environment
210 Simulation sub-module
220 Emulation sub-module (Virtual machine)
230 Physical sub-module (Physical machine)
310 Constrains
320 System information
330 Designed result
340 Importance
350 Difficulties to model
360 Weight coefficients
400 User interface
410 Input interface
420 Output interface
510 Condition Definition sub-module
520 Effectiveness Definition sub-module
522 Refined potential Calculation sub-module
524 Duplicated Priority Calculation sub-module
530 Duplication Level Determination sub-module

The invention claimed is:

1. A security assessment system configured to provide a duplicated environment which duplicates an assessment target system comprising a plurality of physical components, the security assessment system comprising:
a duplicated environment design circuitry configured to select a duplication level for each physical component based on constraints specified by a user and a duplicated priority associated with the physical components in order to design the duplicated environment to produce a designed result indicative of duplicated environment design, the duplication level being indicative of any one of a simulation sub-module, an emulation sub-module, and a physical sub-module which are for reproducing the physical components of the assessment target system; and
a duplicated environment construction circuitry configured to construct the duplicated environment based on the designed result, the duplicated environment comprises components which are duplicated by one of duplication levels,
wherein the constraints comprise at least one selected from the group consisting of budget and time, and
wherein the duplicated environment design circuitry is configured to select the duplication level for each physical component that satisfies a condition that required cost doesn't exceed the budget or required time doesn't exceed the time based on the duplicated priority of each physical component that is determined based on at least one selected from the group consisting of importance of each physical component, potential to refine a security diagnosis, and difficulties to model each physical component.

2. The security assessment system as claimed in claim 1, wherein further comprises:
an input interface configured to input at least one selected from the group consisting of the budget and the time; and
an output interface configured to output the designed result.

3. The security assessment system as claimed in claim 2, wherein further comprises a diagnosis interface configured to carry out, on the duplicated environment, a security diagnosis including at least one selected from the group consisting of an active scan and a penetration test.

4. The security assessment system as claimed in claim 3, wherein the diagnosis interface comprises:
an active scan/pen-test circuitry configured to actively scan and/or pen-test on a virtual machine and/or a physical machine in the duplicated environment to produce a result of an active scan/pen-test,
a vulnerability assessment circuitry configured to extract vulnerabilities of each component in the emulation sub-module and the physical sub-module based on the result of an active scan/pen-test to generate a list indicative of the extracted vulnerabilities; and
an attack graph generation circuitry configured to generate an attack graph based on the result of an active scan/pen-test,
wherein the duplicated environment design circuitry is configured to select the duplication level based on at least one selected from the group consisting of the list and the attack graph.

5. The security assessment system as claimed in claim 4, wherein the duplicated environment design circuitry comprises:
a condition definition sub-circuitry configured to define conditions based on the constraints to produce a first defined result indicative of the conditions;
an effectiveness definition sub-circuitry configured to define effectiveness for the physical components based on the effects to produce a second defined result indicative of the effectiveness; and
a duplication level determination sub-circuitry configured to determine the duplication level based on the first and the second defined results.

6. The security assessment system as claimed in claim 5, wherein the effectiveness definition sub-circuitry comprises:
- a refined potential calculation sub-module configured to calculate the potential to refine a security diagnosis based on at least one of selected from the group consisting of the extracted vulnerabilities, the attack graph, and information obtained by a passive scan to produce a refined potential indicative of the potential to refine a security diagnosis; and
- a duplicated priority calculating sub-module configured to calculating the duplicated priority of each physical component based on at least one selected from the group consisting of the importance of each physical component, the refined potential, and the difficulties to model each physical component to produce, as the second defined result, the duplicated priority of each physical component.

7. The security assessment system as claimed in claim 6, wherein the input interface is further configured to input the importance of each physical component, the difficulties to model each physical component, and weight coefficients for the importance of each physical component, for the potential to refine a security diagnosis, and for the difficulties to model each physical component.

8. A method, performed by an information processing unit, of providing a duplicated environment which duplicates an assessment target system comprising a plurality of physical components, the method comprising:
- selecting a duplication level based on constraints specified by a user and a duplicated priority associated with the physical components in order to design the duplicated environment to produce a designed result indicative of a duplicated environment design, the duplication level being indicative of any one of a simulation sub-module, an emulation sub-module, and a physical sub-module which are for reproducing the physical components of the assessment target system; and
- constructing the duplicated environment based on the designed result, the duplicated environment comprises components which are duplicated by one of the duplication level,
- wherein the constraints comprise at least one selected from the group consisting of budget and time, and
- wherein the selecting the duplication level is for selecting the duplication level for each physical component that satisfies a condition that required cost doesn't exceed the budget or required time doesn't exceed the time based on the duplicated priority of each physical component that is determined based on at least one selected from the group consisting of importance of each physical component, potential to refine a security diagnosis, and difficulties to model each physical component.

9. A non-transitory computer readable recording medium in which a security assessment program is recorded, the security assessment program causing a computer to execute so as to provide a duplicated environment which duplicates an assessment target system comprising a plurality of physical components, the security assessment program causing the computer to execute the steps of:
- selecting a duplication level based on constraints specified by a user and a duplicated priority associated with the physical components in order to design the duplicated environment to produce a designed result indicative of a duplicated environment design, the duplication level being indicative of any one of a simulation sub-module, an emulation sub-module, and a physical sub-module which are for reproducing the physical components of the assessment target system; and constructing the duplicated environment based on the designed result, the duplicated environment comprises components which are duplicated by one of the duplication level,
- wherein the constraints comprise at least one selected from the group consisting of budget and time, and
- wherein the selecting the duplication level is for selecting the duplication level for each physical component that satisfies a condition that required cost doesn't exceed the budget or required time doesn't exceed the time based on the duplicated priority of each physical component that is determined based on at least one selected from the group consisting of importance of each physical component, potential to refine a security diagnosis, and difficulties to model each physical component.

* * * * *